US012080943B2

(12) United States Patent
Wu et al.

(10) Patent No.: US 12,080,943 B2
(45) Date of Patent: Sep. 3, 2024

(54) ANTENNA MODULE

(71) Applicant: PEGATRON CORPORATION, Taipei (TW)

(72) Inventors: Chien-Yi Wu, Taipei (TW); Tse-Hsuan Wang, Taipei (TW); Chih-Fu Chang, Taipei (TW); Chao-Hsu Wu, Taipei (TW); Shih-Keng Huang, Taipei (TW); Hau Yuen Tan, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 135 days.

(21) Appl. No.: 17/677,232

(22) Filed: Feb. 22, 2022

(65) Prior Publication Data

US 2022/0344804 A1 Oct. 27, 2022

(30) Foreign Application Priority Data

Apr. 22, 2021 (TW) ................................ 110114525

(51) Int. Cl.
*H01Q 1/48* (2006.01)
*H01Q 9/04* (2006.01)
*H01Q 21/00* (2006.01)

(52) U.S. Cl.
CPC ............. *H01Q 1/48* (2013.01); *H01Q 9/0428* (2013.01); *H01Q 21/0075* (2013.01)

(58) Field of Classification Search
CPC .... H01Q 1/48; H01Q 9/0428; H01Q 21/0075; H01Q 9/0442; H01Q 9/045; H01Q 21/065; H01Q 9/0407–0478
USPC .......................................................... 343/848
See application file for complete search history.

(56) References Cited

U.S. PATENT DOCUMENTS 3,947,850 A * 3/1976 Kaloi .................. H01Q 9/0407 343/822
4,063,246 A * 12/1977 Greiser ................ H01Q 21/065 343/846
4,072,951 A * 2/1978 Kaloi .................. H01Q 9/0407 343/846

(Continued)

FOREIGN PATENT DOCUMENTS

| | | |
|---|---|---|
| JP | 2011091557 | 5/2011 |
| TW | 200711223 | 3/2007 |

(Continued)

*Primary Examiner* — Dameon E Levi
*Assistant Examiner* — Tan Minh Nguyen
(74) *Attorney, Agent, or Firm* — J.C. PATENTS

(57) ABSTRACT

An antenna module disposed on a substrate having a first and a second surface opposite to each other includes a microstrip line, a first radiator, a ground radiator and a ground plane. The microstrip line, the first radiator and the ground radiator are disposed on the first surface. The microstrip line includes a first and a second end opposite to each other. The first end includes a first feeding end. The first radiator is connected to the second end of the microstrip line. The ground radiator surrounds the microstrip line and the first radiator and has a first opening and two opposite grounding ends. The first end of the microstrip line is located in the first opening. A gap is formed between each grounding end and the first feeding end. The ground plane is disposed on the second surface. The ground radiator is connected to the ground plane.

17 Claims, 7 Drawing Sheets

(56) References Cited

U.S. PATENT DOCUMENTS

| | | | | |
|---|---|---|---|---|
| 4,197,544 | A * | 4/1980 | Kaloi | H01Q 9/0407 343/846 |
| 5,001,492 | A * | 3/1991 | Shapiro | H01P 5/187 333/116 |
| 5,414,434 | A * | 5/1995 | Conant | H01Q 9/0457 343/846 |
| 5,933,115 | A * | 8/1999 | Faraone | H01Q 9/0428 343/700 MS |
| 6,002,368 | A * | 12/1999 | Faraone | H01Q 9/0457 343/700 MS |
| 6,181,281 | B1 * | 1/2001 | Desclos | H01Q 9/0407 343/700 MS |
| 6,339,404 | B1 * | 1/2002 | Johnson | H01Q 25/005 343/702 |
| 7,589,676 | B2 * | 9/2009 | Popugaev | H01Q 5/378 343/700 MS |
| 7,675,466 | B2 * | 3/2010 | Gaucher | H01Q 21/062 343/905 |
| 7,688,276 | B2 * | 3/2010 | Quintero Illera | H01Q 1/36 343/846 |
| 8,004,466 | B2 * | 8/2011 | Kim | H01Q 1/38 343/846 |
| 8,232,924 | B2 * | 7/2012 | Bucca | H01Q 23/00 343/702 |
| 9,647,328 | B2 * | 5/2017 | Dobric | H01Q 9/0428 |
| 10,283,871 | B2 * | 5/2019 | Gong | H01Q 21/064 |
| 10,290,942 | B1 * | 5/2019 | Catoiu | H01Q 21/22 |
| 10,622,706 | B2 * | 4/2020 | Moon | H01Q 5/42 |
| 10,658,755 | B2 * | 5/2020 | Hashimoto | H01Q 9/0457 |
| 10,741,908 | B2 * | 8/2020 | Sanders | H01Q 9/0428 |
| 10,886,608 | B2 * | 1/2021 | Kim | H01Q 1/523 |
| 11,043,749 | B2 * | 6/2021 | Wu | H01Q 21/08 |
| 11,050,147 | B2 * | 6/2021 | Zaric | H01P 3/003 |
| 11,404,784 | B2 * | 8/2022 | Hallivuori | H01Q 5/40 |
| 11,515,648 | B2 * | 11/2022 | Liao | H01Q 1/2283 |
| 2002/0122010 | A1 * | 9/2002 | McCorkle | H01Q 9/40 343/846 |
| 2009/0140927 | A1 * | 6/2009 | Maeda | H01Q 9/045 343/700 MS |
| 2010/0134376 | A1 * | 6/2010 | Margomenos | H01Q 21/065 343/860 |
| 2011/0057853 | A1 * | 3/2011 | Kim | H01Q 9/0442 343/846 |
| 2012/0007781 | A1 * | 1/2012 | Kim | H01Q 1/2283 343/700 MS |
| 2016/0197404 | A1 * | 7/2016 | Hashimoto | H01Q 1/48 343/848 |
| 2017/0040711 | A1 * | 2/2017 | Rakib | H01Q 25/002 |
| 2017/0170567 | A1 * | 6/2017 | Luo | H01Q 21/24 |
| 2018/0358707 | A1 * | 12/2018 | Jamaly | H01Q 21/28 |
| 2020/0036104 | A1 * | 1/2020 | Baumgartner | H01Q 13/06 |
| 2020/0321248 | A1 * | 10/2020 | Huang | H01Q 1/48 |
| 2020/0343640 | A1 * | 10/2020 | Veihl | H01Q 9/0414 |
| 2020/0358205 | A1 * | 11/2020 | Sun | H01Q 21/065 |
| 2020/0373673 | A1 * | 11/2020 | Hashemi | H01Q 21/0025 |
| 2020/0381835 | A1 * | 12/2020 | Chou | H01Q 1/38 |
| 2020/0411967 | A1 * | 12/2020 | Liu | H01Q 19/106 |
| 2021/0126368 | A1 * | 4/2021 | Hsiao | H01Q 1/48 |
| 2022/0328953 | A1 * | 10/2022 | Huang | H01Q 9/0457 |
| 2023/0130741 | A1 * | 4/2023 | Itami | H01Q 1/2283 343/702 |
| 2023/0231319 | A1 * | 7/2023 | Gonzalez | H01Q 5/378 343/702 |

FOREIGN PATENT DOCUMENTS

| | | |
|---|---|---|
| TW | I700863 | 8/2020 |
| TW | I703768 | 9/2020 |

* cited by examiner

ANTENNA MODULE

CROSS-REFERENCE TO RELATED APPLICATION

This application claims the priority benefit of Taiwan application serial no. 110114525, filed on Apr. 22, 2021. The entirety of the above-mentioned patent application is hereby incorporated by reference herein and made a part of this specification.

BACKGROUND

Technology Field

The disclosure relates to an antenna module, and particularly, to a millimeter wave antenna module.

Description of Related Art

The application of the millimeter wave (mmWave) band n257 of the fifth generation mobile communication (5G) covering 26.5-29.5 GHz is called 28 GHz millimeter wave, and the application of the band n260 covering 37-40 GHz is called 39 GHz millimeter wave. Currently, how to design a millimeter wave antenna with the characteristics of a dual-polarized antenna is the current research direction.

SUMMARY

The disclosure provides an antenna module with the characteristics of a dual-polarized antenna.

An antenna module of the disclosure is disposed on a substrate, and the substrate includes a first surface and a second surface opposite to each other. The antenna module includes a microstrip line, a first radiator, a ground radiator, and a ground plane. The microstrip line is disposed on the first surface of the substrate and includes a first end and a second end opposite to each other. The first end is a first feeding end. The first radiator is disposed on the first surface of the substrate and connected to the second end of the microstrip line. The ground radiator is disposed on the first surface of the substrate and surrounds the microstrip line and the first radiator. The ground radiator includes a first opening and two opposite grounding ends corresponding to the first opening, the first end of the microstrip line is located in the first opening, and a gap is formed between each of the two grounding ends and the first feeding end. The ground plane is disposed on the second surface of the substrate. The ground radiator is connected to the ground plane.

In summary, the microstrip line of the antenna module of the disclosure includes the first feeding end, and the first radiator is connected to the second end of the microstrip line. The ground radiator surrounds the microstrip line and the first radiator. The two grounding ends of the ground radiator correspond to the first opening. The first end of the microstrip line is located in the first opening. A gap is formed between each grounding end and the first feeding end. The microstrip line, the first radiator, and the ground radiator are disposed on the first surface of the substrate, and the ground plane is disposed on the second surface of the substrate. The ground radiator is connected to the ground plane. With the design, the antenna module of the disclosure may have the characteristics of a dual-polarized antenna.

DESCRIPTION OF THE EMBODIMENTS

Figure 1:
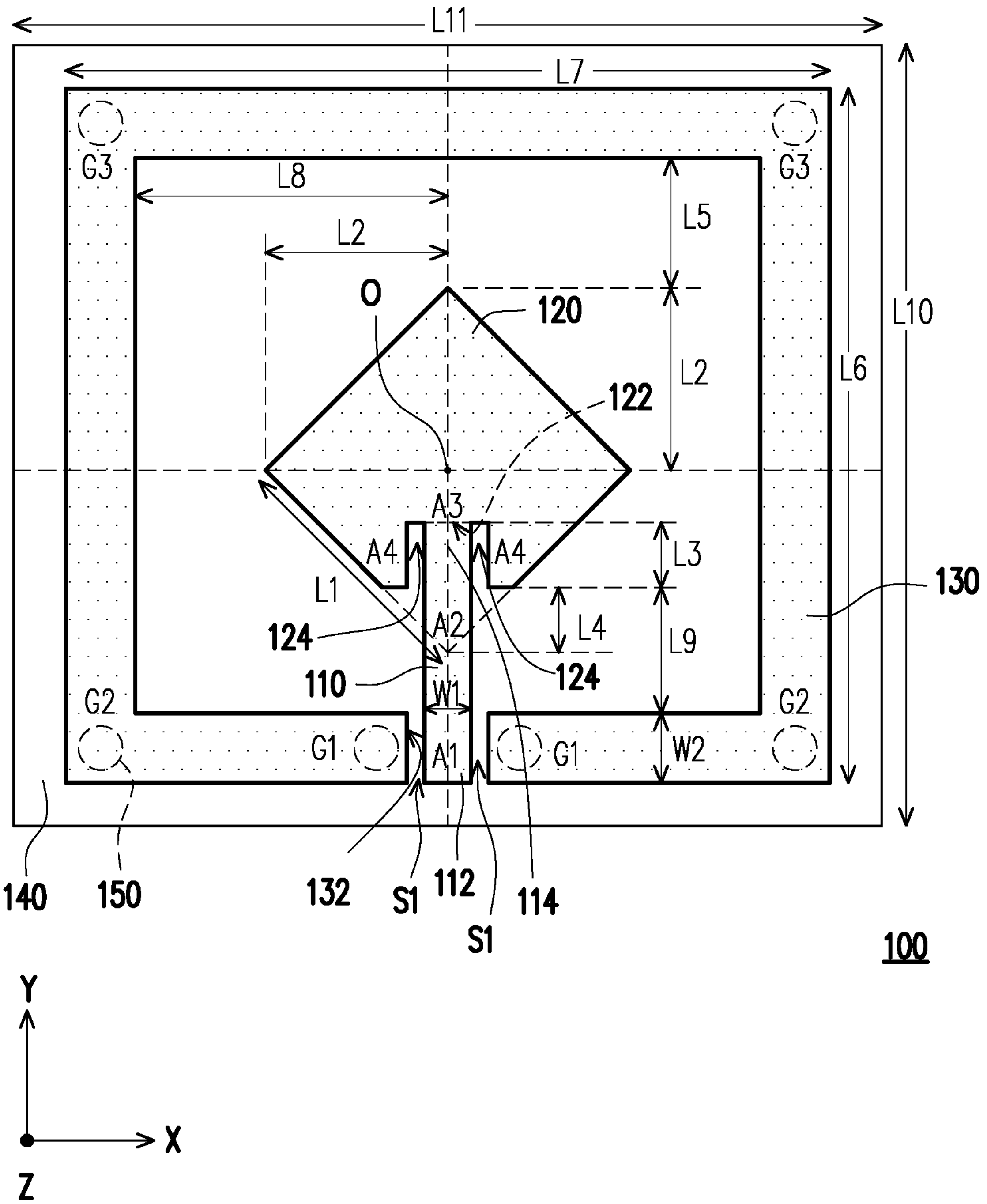
FIG. 1 is a schematic top view of an antenna module according to an embodiment of the disclosure.

FIG. 1 is a schematic top view of an antenna module according to an embodiment of the disclosure. Referring to FIG. 1, an antenna module 100 of the embodiment includes a microstrip line 110, a first radiator 120, a ground radiator 130, and a ground plane 140 located thereunder. In the embodiment, the antenna module 100 is a millimeter wave antenna, which can resonate at a frequency band of 24 GHz, 28 GHz, or/and 39 GHz, for example.

The microstrip line 110 (positions A1 to A3) includes a first end 112 and a second end 114 opposite to each other. The first end 112 includes a first feeding end (the position A1). A width W1 of the microstrip line 110 is between 0.04 times and 0.06 times the wavelength of the frequency band, in which the antenna module 100 resonates at the frequency band. In the embodiment, the said frequency band is 24 GHz, for example, and the width W1 of the microstrip line 110 is about 0.54 mm.

The first radiator 120 is connected to the second end 114 of the microstrip line 110. In the embodiment, a shape of the first radiator 120 is rhombic. In other embodiments, the first radiator 120 may also be of other symmetrical shapes, such as circular or trapezoidal, and the disclosure is not limited thereto.

A side length L1 of the first radiator 120 is a quarter of wavelength of the frequency band, in which the antenna module 100 resonates at the frequency band. In the embodiment, the said frequency band is 24 GHz, for example, and the side length L1 of the first radiator 120 is approximately 2.97 mm. A distance L2 from a center O of the first radiator 120 to the left, right, or upper end is about 2.1 mm.

In addition, the first radiator 120 includes a recess portion 122, and the second end 114 of the microstrip line 110 is connected to the recess portion 122. The width of the recess portion 122 is greater than the width of the second end 114 of the microstrip line 110. The second end 114 of the microstrip line 110 is located in the recess portion 122. Two slots 124 are formed between opposite sides of the microstrip line 110 and the inner edge of the recess portion 122 of the first radiator 120.

The slot 124 is used to adjust 28 GHz impedance matching. According to FIG. 1, the minimum length of the slot 124 may be a length L3, and the maximum length is close to the sum of the length L3 and a length L4. Therefore, the length of the slot 124 is between 0.05 times and 0.14 times the wavelength of the frequency band, in which the antenna module 100 resonates at the frequency band. In the embodiment, the said frequency band is 24 GHz, for example, the length L3 from a position A4 to the bottom of the slot 124 is 0.75 mm, and the length L4 from the position A2 to the position A4 is about 0.75 mm. The width of the slot 124 is 0.1 mm to 0.3 mm.

Figure 4:
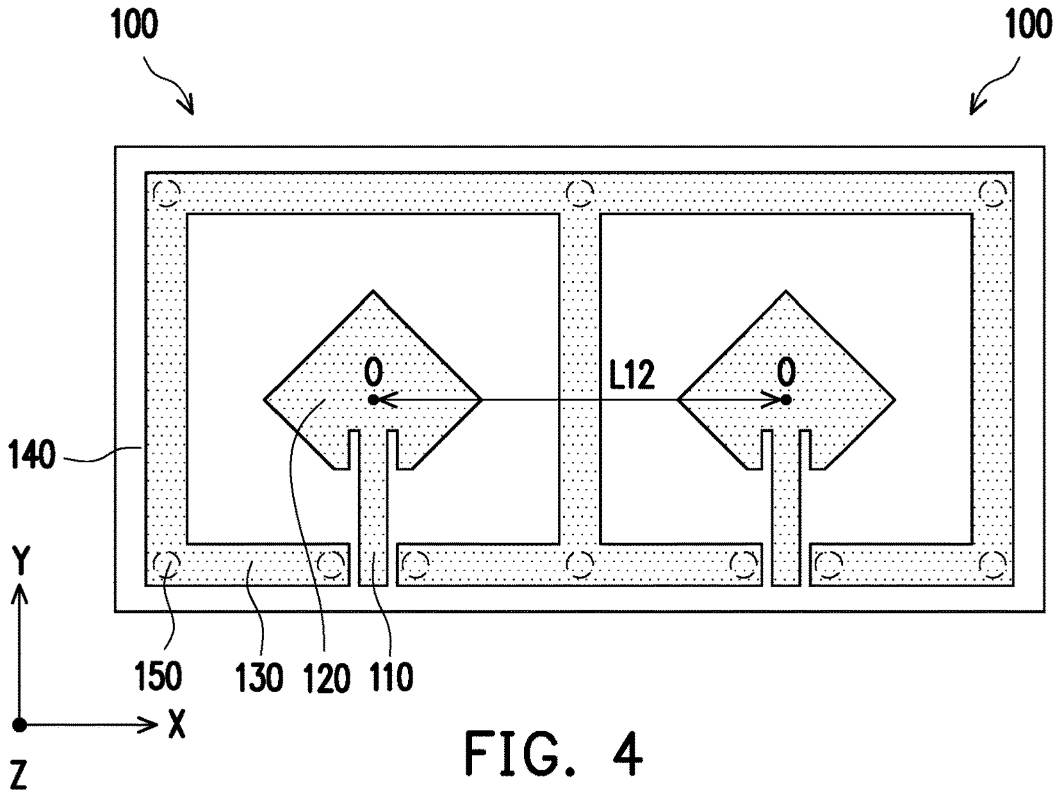
FIG. 4 is a schematic top view of disposing the antenna modules of FIG. 1 into an array.

A ground radiator 130 (positions G1, G2, G3, G3, G2, G1) surrounds the microstrip line 110 and the first radiator 120. A minimum distance L5 between each of the three ends (upper end, left end, right end) of the first radiator 120 away from the microstrip line 110 and the ground radiator 130 is greater than or equal to one-eighth of the wavelength of the frequency band, in which the antenna module 100 resonates at the frequency band. If multiple antenna modules 100 are disposed in an array (as shown in FIG. 4), the minimum distance L5 can ensure sufficient isolation between two adjacent antenna modules 100. In the embodiment, the said frequency band is 24 GHz, for example, and the distance L5 is about 1.5 mm.

A shape of the ground radiator 130 is a hollow rectangle including a first opening 132. A maximum length L6 of the ground radiator 130 in the Y direction is about 8 mm, and a maximum length L7 of the ground radiator 130 in the X direction is about 8.8 mm. The width W2 of the ground radiator 130 is between 0.05 times and 0.08 times the wavelength of the frequency band. In the embodiment, the said frequency band is 24 GHz, for example, and the width W2 of the ground radiator 130 is 0.8 mm.

The first radiator 120 is located in the ground radiator 130, and the first radiator 120 and the hollow rectangular ground radiator 130 have the same center O. A shortest distance L8 from the center O to the ground radiator 130 at the positions G2 and G3 is about 3.6 mm.

In addition, the ground radiator 130 includes two opposite grounding ends (the position G1) corresponding to the first opening 132, and the first opening 132 is located between the two grounding ends (the position G1). The first end 112 of the microstrip line 110, that is, the first feeding end (the position A1), is located in the first opening 132. In other words, the two grounding points (the position G1) are located on opposite sides of the first feeding end (the position A1). In the embodiment, a gap S1 is formed between the grounding end (the position G1) and the first feeding end (the position A1). The width of the gap S1 is between 0.1 mm and 0.3 mm.

In addition, a shortest distance L9 (the distance from the position A4 to the position G1) between the first radiator 120 and the grounding end (the position G1) is between 0.12 to 0.14 wavelengths of the frequency band, in which the antenna module 100 resonates at the frequency band. In the embodiment, the said frequency band is 24 GHz, for example, and the shortest distance L9 is about 1.45 mm.

In the embodiment, the microstrip line 110, the first radiator 120, and the ground radiator 130 are coplanar to form a coplanar waveguide antenna structure. The ground plane 140 is located below the microstrip line 110, the first radiator 120, and the ground radiator 130. In the embodiment, a maximum length L10 of the ground plane 140 in the Y direction is about 9 mm, and a maximum length L11 of the first radiator 120 in the X direction is about 10 mm, but it is not limited thereto. According to FIG. 1, the projections of the microstrip line 110, the first radiator 120, and the ground radiator 130 on the plane where the ground plane 140 is located are overlapped with the ground plane 140.

In addition, the ground radiator 130 may be connected to the ground plane 140 through multiple conducting elements 150 to form a differential loop ground structure. In the embodiment, the conducting elements 150 are disposed at the positions G1, G2, and G3.

Figure 2:
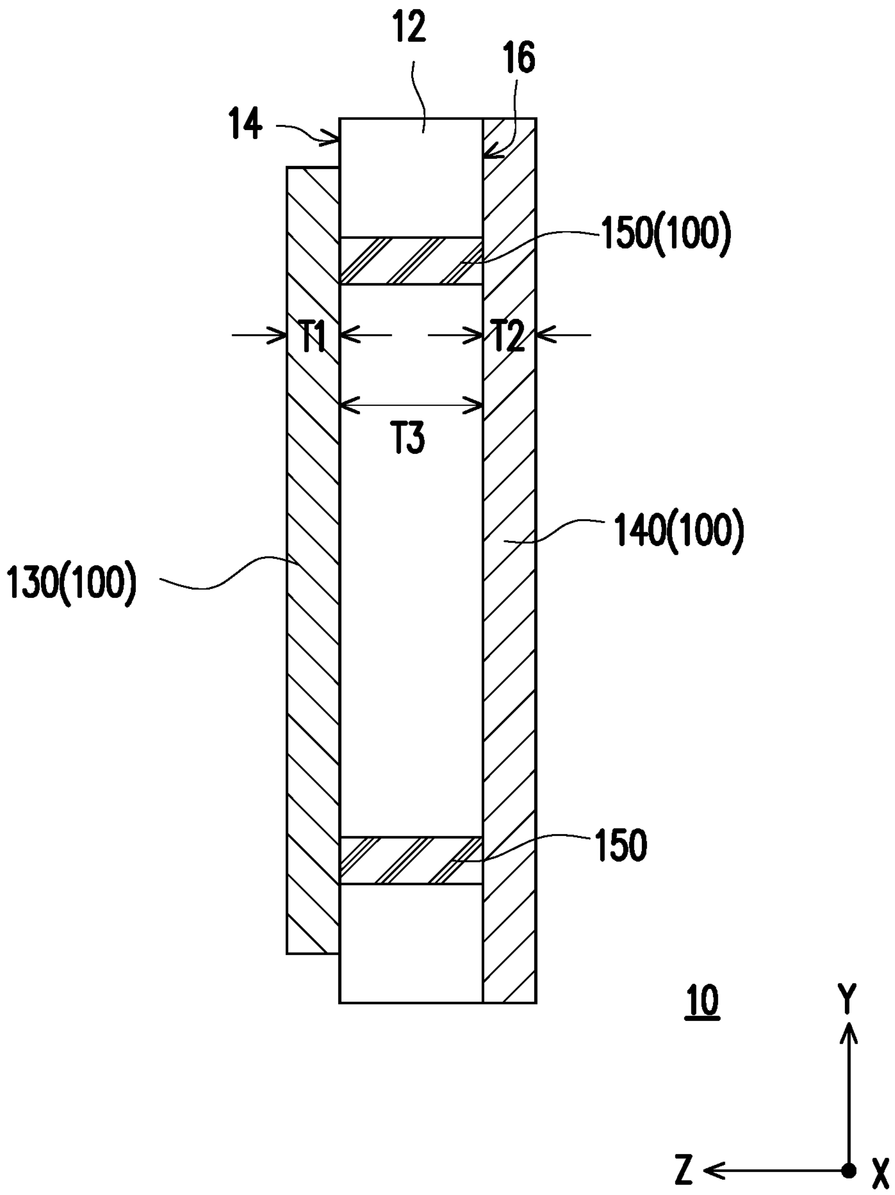
FIG. 2 is a schematic side view of FIG. 1.

FIG. 2 is a schematic side view of FIG. 1. Referring to FIG. 2, the antenna module 100 may be disposed on a double-layer circuit board 10. The length, width, and thickness of the double-layer circuit board 10 are approximately 10 mm, 9 mm, and 0.315 mm, respectively. The double-layer circuit board 10 includes a substrate 12. The microstrip line 110, the first radiator 120, and the ground radiator 130 can be made of a copper layer and disposed on a first surface 14 of the substrate 12 with a thickness T1 of 0.04318 mm. The ground plane 140 can be made of a copper layer and be disposed on a second surface 16 of the substrate 12 with a thickness T2 of 0.01778 mm. A thickness T3 of the substrate 12 is between 0.2 mm and 0.3 mm.

Figure 3:
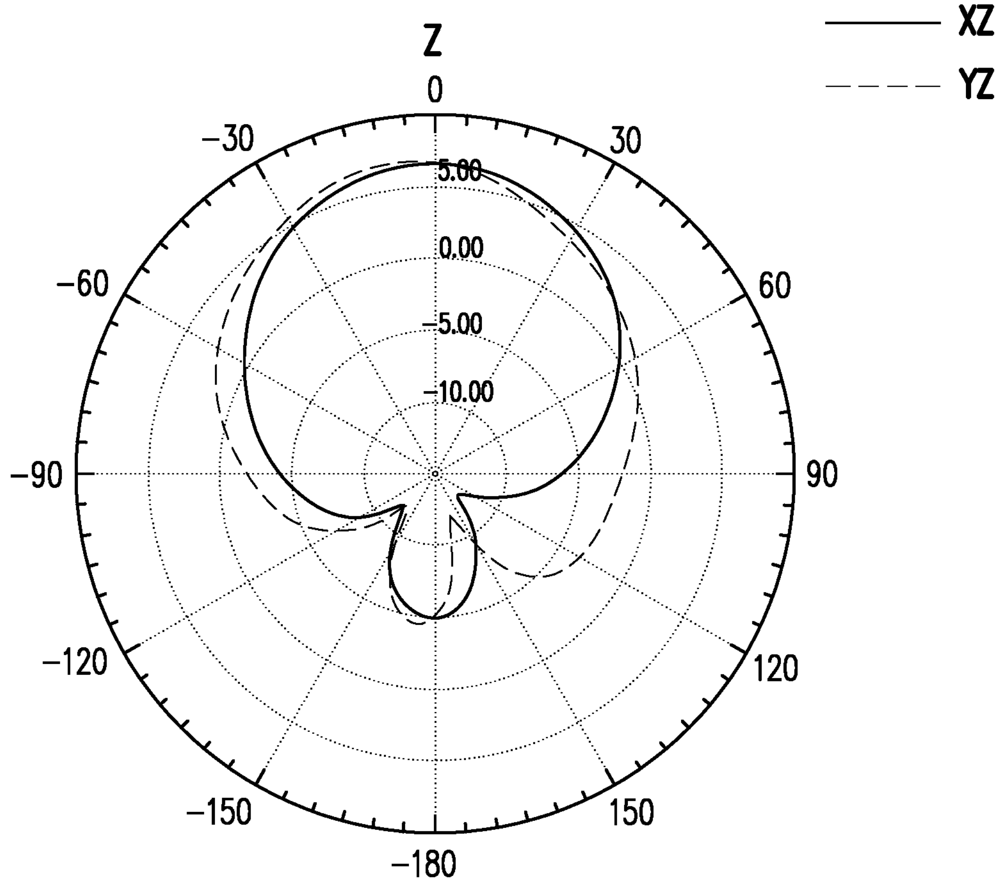
FIG. 3 is a radiation pattern diagram of the antenna module of FIG. 1 in a Z direction.

FIG. 3 is a radiation pattern diagram of the antenna module of FIG. 1 in a Z direction. Referring to FIG. 3, the solid line represents the radiation pattern of the XZ plane, and the dashed line represents the radiation pattern of the YZ plane. According to FIG. 3, the radiation patterns of the antenna module 100 in the XZ plane and the YZ plane both have energy performance concentrated in the Z-axis direction and have the characteristics of a dual-polarized antenna. In one embodiment, if the shape of the first radiator 120 cuts corners at the left and right ends of the rhombus, the effect of a circularly polarized antenna is achieved.

FIG. 4 is a schematic top view of disposing the antenna modules of FIG. 1 into an array. Referring to FIG. 4, in the embodiment, the two antenna modules 100 of FIG. 1 are disposed in a 1×2 array, and a distance L12 between the two centers O of the two antenna modules 100 is between 0.5 times to 0.75 times the wavelength of the frequency band, in which the antenna module 100 resonates at the frequency band. In the embodiment, the said frequency band is 24 GHz, for example, and the distance L12 is about 8 mm.

Figure 5:
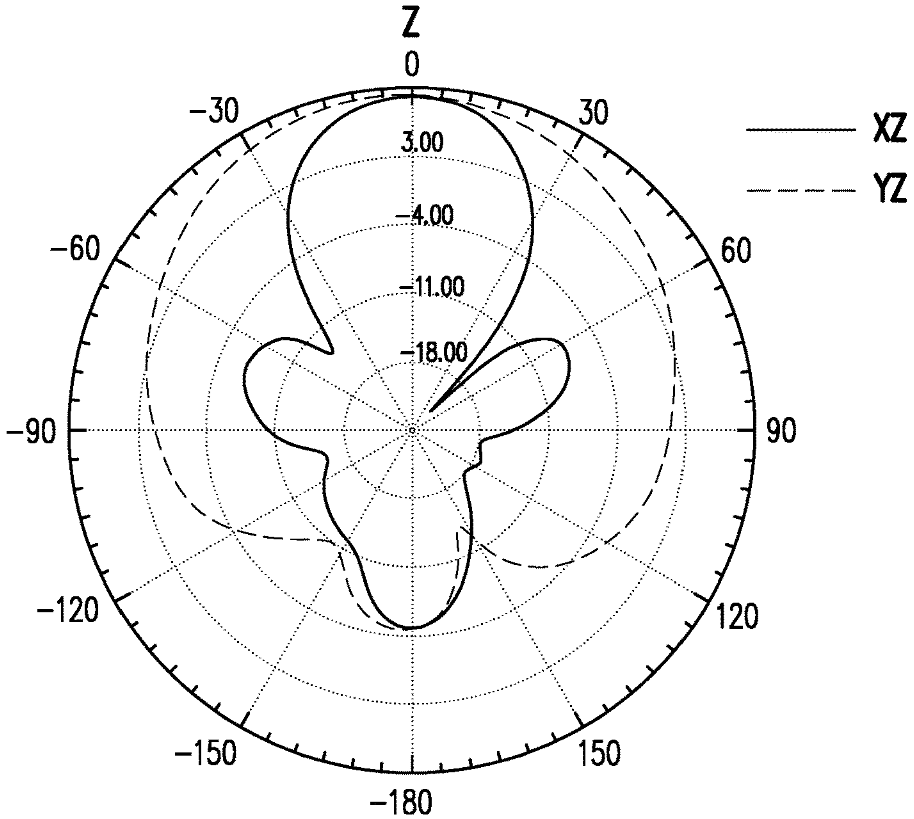
FIG. 5 is a radiation pattern diagram of the antenna module of FIG. 4 in the array form in the Z direction.

FIG. 5 is a radiation pattern diagram of the antenna module of FIG. 4 in the array form in the Z direction. Referring to FIG. 5, the solid line represents the radiation pattern of the XZ plane, and the dashed line represents the radiation pattern of the YZ plane. In the embodiment, since the ground radiator 130, the conducting elements 150, and the ground plane 140 form a differential loop ground structure, the radiation pattern of the YZ plane has small side beams and small back radiation, and the main beam is concentrated on the Z-axis direction.

In addition, through simulation, the peak gain of a single antenna module 100 as shown in FIG. 1 is about 6.5 dBi, and the peak gain of the antenna modules 100 in the 1×2 array as shown in FIG. 4 is about 9.2 dBi. If the antenna modules 100 are disposed in a 1×4 array, the peak gain is approximately 12.2 dBi. That is, either the single antenna module 100 or the antenna modules 100 disposed in an array may have good performance.

In addition, in the antenna modules 100 of the 1×2 array and the antenna modules 100 of the 1×4 array, the differential loop structure may allow the isolation between two adjacent antenna modules 100 to have performance of below −25 dB, such that the said antenna arrays achieve good performance.

Figure 6:
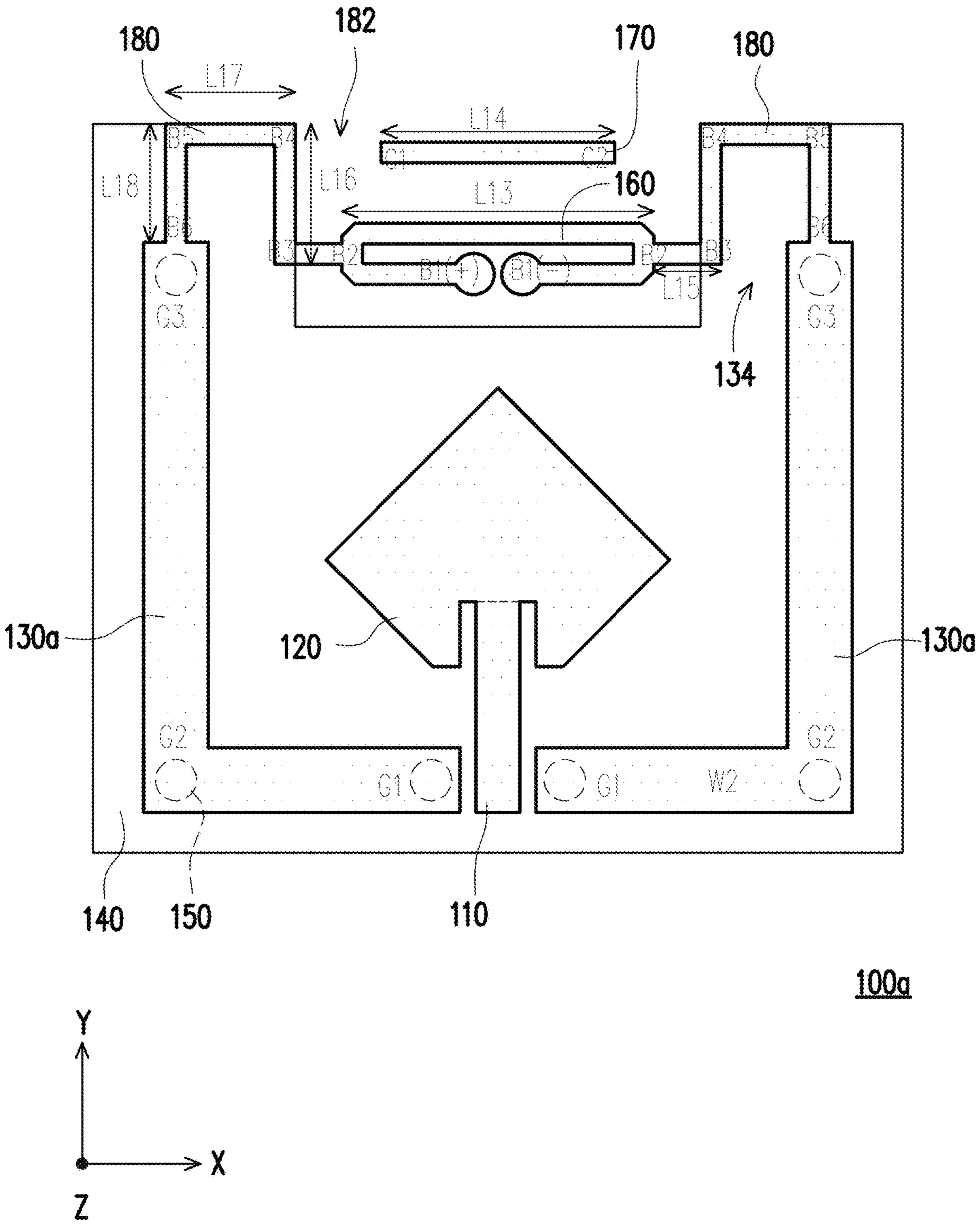
FIG. 6 is a schematic top view of an antenna module according to another embodiment of the disclosure.

FIG. 6 is a schematic top view of an antenna module according to another embodiment of the disclosure. Referring to FIG. 6, the main difference between the antenna module 100 of FIG. 1 and an antenna module 100*a* of FIG. 6 is that in the embodiment, the antenna module 100*a* further includes a second radiator 160, a third radiator 170 and two connecting radiators 180. In the embodiment, the widths of the second radiator 160, the third radiator 170, and each connecting radiator 180 are equal and less than the width of one of two ground radiators 130*a*. In the embodiment, the shape of the second radiator 160 is annular, and the shape of the third radiator 170 is striped.

The ground radiator 130 further includes a second opening 134 away from the first opening 132 to divide the ground radiator 130 into the two ground radiators 130*a*. The second radiator 160 (including positions B1(+), B2, B2, B1(−)) is disposed on the first surface 14 (FIG. 2) of the substrate 12 and located in the second opening 134. The second radiator 160 includes two second feeding ends (at the positions B1(+) and B1(−)), that is, one end is a positive end and the other one is a negative end. The length of the second radiator 160 is approximately a half of wavelength of the frequency band, in which the antenna module 100*a* resonates at the frequency band. In the embodiment, the said frequency band is 24 GHz, for example, and a distance L13 between the two positions B2 is about 3.6 mm. The length of the second radiator 160 is approximately twice the distance L13.

The third radiator 170 (including position C1 and position C2) is disposed on the first surface 14 (FIG. 2) of the substrate 12 and located on a side of the second radiator 160 opposite to the first radiator 120. A length L14 of the third radiator 170 is approximately a quarter of wavelength of the frequency band. In the embodiment, the said frequency band is 24 GHz, for example, and the length L14 of the third radiator 170 is approximately 2.88 mm.

In the embodiment, the two ground radiators 130*a* of the antenna module 100*a* are L-shaped and a mirrored L-shape respectively, symmetrically located beside the microstrip line 110 and the first radiator 120, and an upper side of the first radiator 120 is exposed. The two connecting radiators 180 are located at the second opening 134 and on both sides of the second radiator 160 to connect the two ends of the second radiator 160 to the two ground radiators 130*a*.

The length of each connecting radiator 180 is about 1.5 times to 2 times the wavelength of the frequency band, in which the antenna module 100*a* resonates at the frequency band. In the embodiment, the said frequency band is 24 GHz, for example, a distance L15 between the position B2 and a position B3 is about 0.7 mm, a distance L16 between the position B3 and a position B4 is about 1.44 mm, a distance L17 between the position B4 and a position B5 is about 1.32 mm, and a distance L18 between the position B5 and the position B6 is about 1.47 mm. The length of the connecting radiator 180 is approximately the sum of the distance L15 to the distance L18.

The two ground radiators 130*a*, the second radiator 160, and the two connecting radiators 180 together surround the first radiator 120. The two connecting radiators 180 have multiple bends, so that the second radiator 160 and the two connecting radiators 180 together form a notch 182, and the third radiator 170 is located in the notch 182. According to FIG. 6, the projections of the second radiator 160 and the third radiator 170 on the plane where the ground plane 140 is located are outside the ground plane 140.

In the antenna module 100*a* of the embodiment, the second radiator 160 is connected to the ground plane 140 through the two connecting radiators 180, the two ground radiators 130*a*, the conducting elements 150, and along with the third radiator 170 together to form a deformed Yagi antenna architecture. In other words, the antenna module 100*a* uses a coplanar waveguide antenna structure (the structure formed by the microstrip line 110, the first radiator 120, and the two ground radiators 130*a*) and the deformed Yagi antenna structure to form a millimeter wave multi-polarized dual antenna architecture.

Figure 7:
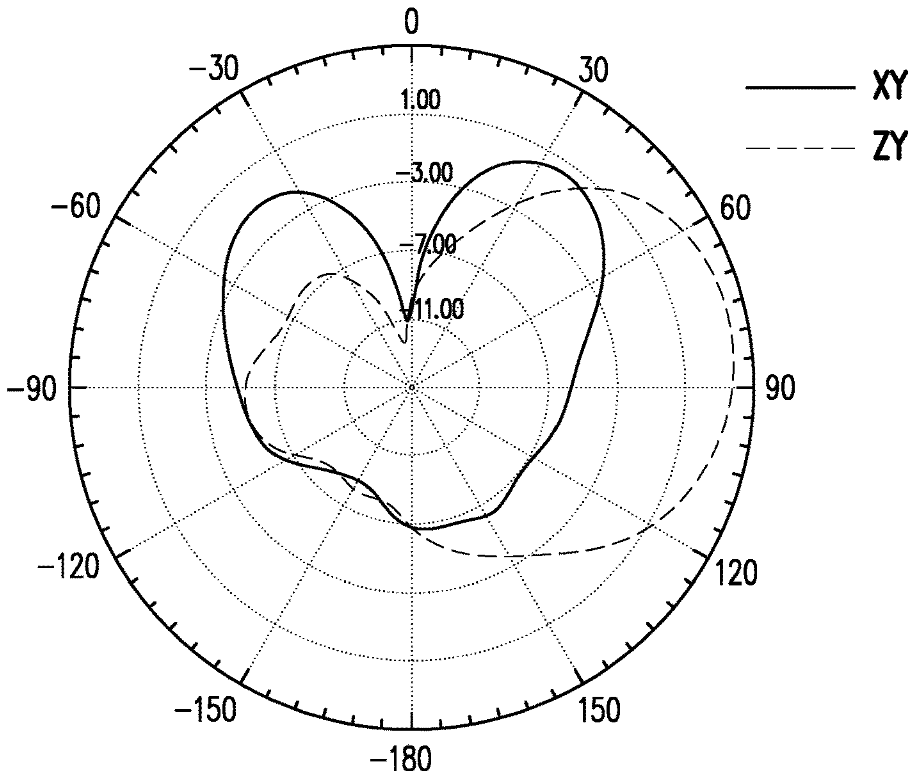
FIG. 7 is a radiation pattern diagram of the antenna module of FIG. 6 in a Y direction.
Figure 8:
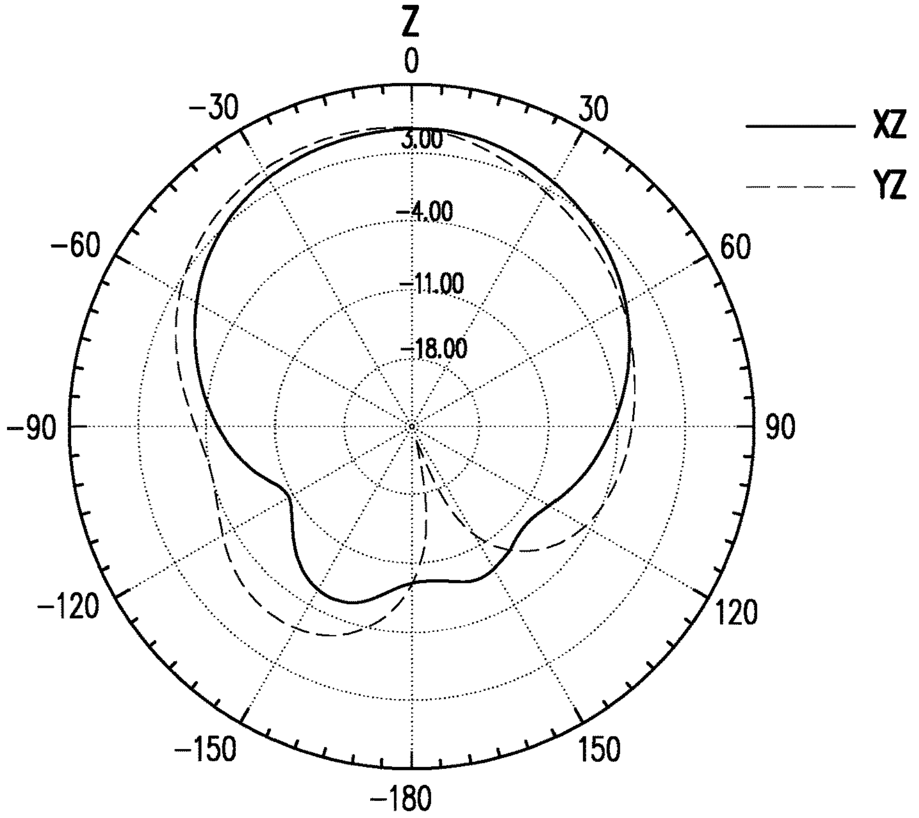
FIG. 8 is a radiation pattern diagram of the antenna module of FIG. 6 in the Z direction.

FIG. 7 is a radiation pattern diagram of the antenna module of FIG. 6 in a Y direction. The solid line represents the radiation pattern of the XY plane, and the dashed line represents the radiation pattern of the ZY plane. FIG. 8 is a radiation pattern diagram of the antenna module of FIG. 6 in the Z direction. The solid line represents the radiation pattern of the XZ plane, and the dashed line represents the radiation pattern of the YZ plane.

Referring to FIG. 6 to FIG. 8, in the embodiment, the antenna module 100*a* is connected to the two ground radiators 130*a* through the path from the position B3 to a position B6 and then connected to the ground plane 140 through the conducting elements 150. According to FIG. 7 and FIG. 8, such a configuration enables the antenna module 100*a* to take into account the transmission energy and reception energy in different polarization directions and have the characteristics of multi-polarization.

Specifically, the coplanar waveguide antenna structure (the structure formed by the microstrip line 110, the first radiator 120, and the two ground radiators 130*a*) may take into account the coverage of both XZ and YZ plane polarization radiation in the Z axis, and the deformed Yagi antenna structure (the structure formed by the second radiator 160, the two connecting radiators 180, the two ground radiators 130*a*, and the third radiator 170) may take into account the coverage of both ZY and XY plane polarization radiation in the Y axis, so the antenna module 100*a* may use the coplanar waveguide antenna structure and the deformed Yagi antenna structure to achieve the characteristics of MIMO multiple antennas, and the transmission rate of the user may be increased or improved through the multi-polarized dual-antenna design structure. In addition, the antenna module 100*a* overcomes the difficulty in the conventional architecture that two antennas with different polarization directions are difficult to be designed on the same plane.

Figure 9:
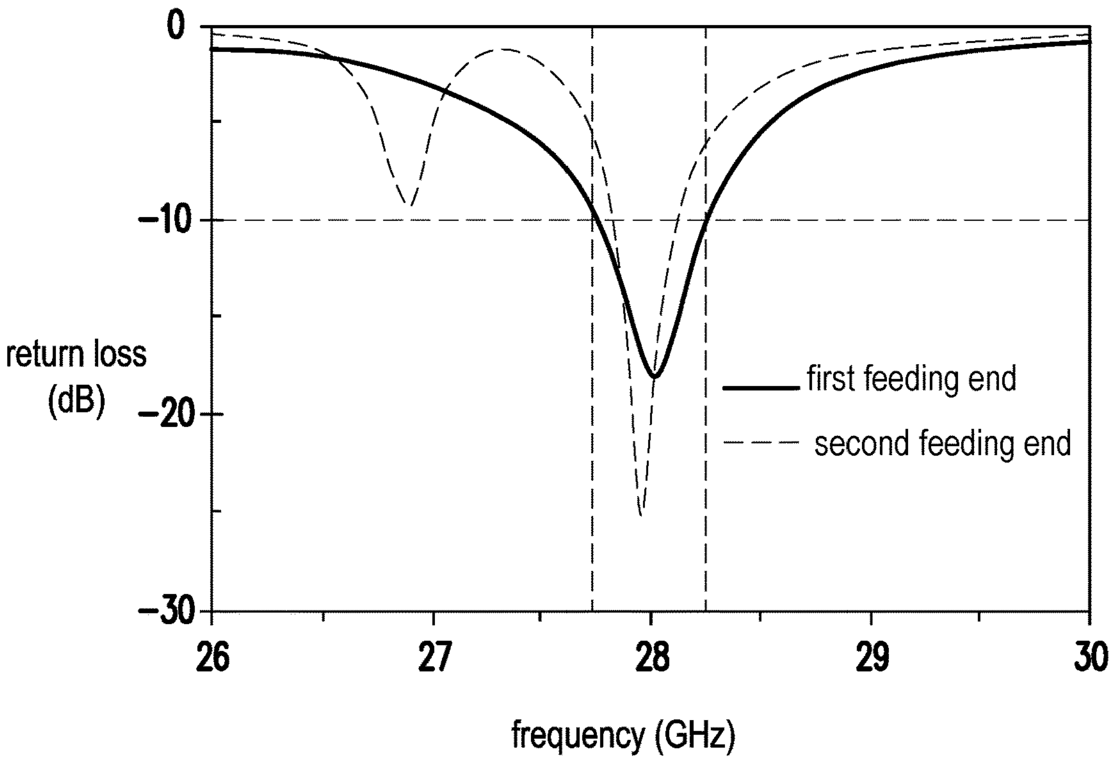
FIG. 9 is a diagram illustrating the relationship between frequency and return loss of the antenna module of FIG. 6.

FIG. 9 is a diagram illustrating the relationship between frequency and return loss of the antenna module of FIG. 6. Referring to FIG. 9, the return losses of the antenna module 100*a* at the first feeding end (the position A1) and the second signal feed point (the positions B1(+) and B1(−)) at 28 GHz may be both below −10 dB and have good performance.

Figure 10:
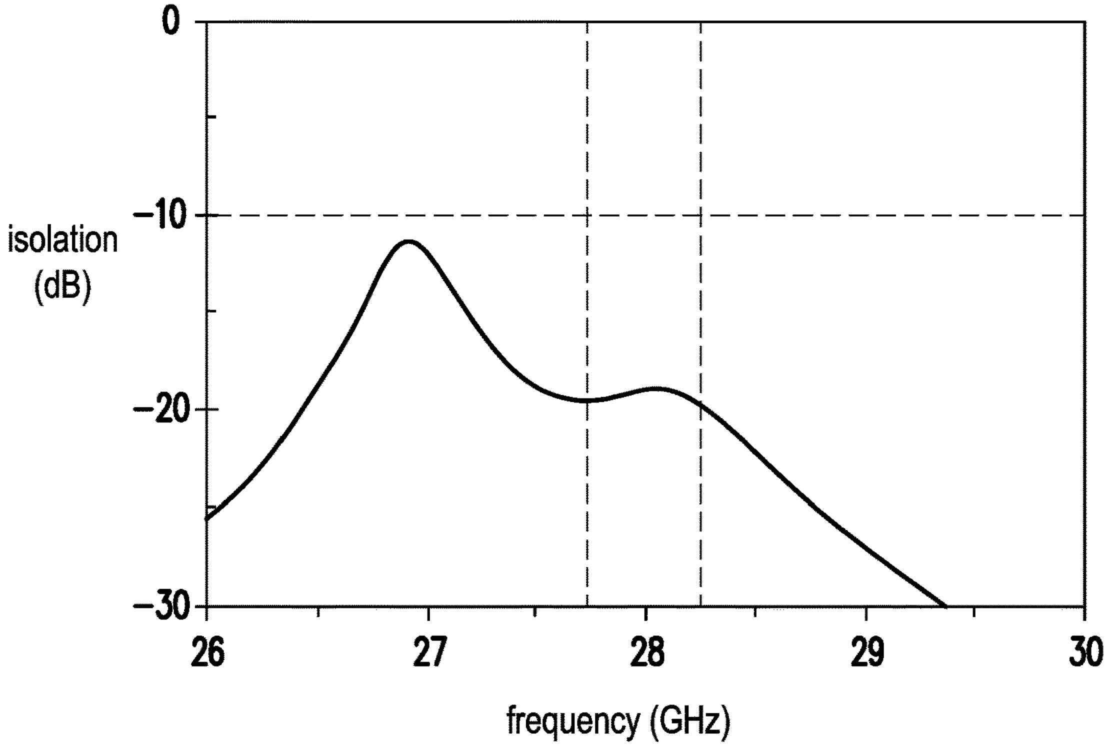
FIG. 10 is a diagram illustrating the relationship between frequency and isolation of the antenna module of FIG. 6.

FIG. 10 is a diagram illustrating the relationship between frequency and isolation of the antenna module of FIG. 6. Referring to FIG. 10, the isolation of the antenna module 100*a* between the first feeding end (the position A1) and the second signal feed point (the positions B1(+) and B1(−)) at 28 GHz is about −20 dB and has good performance.

In summary, the microstrip line of the antenna module of the disclosure includes the first feeding end, and the first radiator is connected to the second end of the microstrip line. The ground radiator surrounds the microstrip line and the first radiator. The two grounding ends of the ground radiator correspond to the first opening. The first end of the microstrip line is located in the first opening. A gap is formed between each grounding end and the first feeding end. The microstrip line, the first radiator, and the ground radiator are disposed on the first surface of the substrate, and the ground plane is disposed on the second surface of the substrate. The ground radiator is connected to the ground plane. With the design, the antenna module of the disclosure may have the characteristics of a dual-polarized antenna.

What is claimed is:

1. An antenna module, disposed on a substrate, wherein the substrate comprises a first surface and a second surface opposite to each other, and the antenna module comprises:

a microstrip line disposed on the first surface of the substrate and comprising a first end and a second end opposite to each other, wherein the first end comprises a first feeding end;

a first radiator disposed on the first surface of the substrate and connected to the second end of the microstrip line;

a ground radiator disposed on the first surface of the substrate and surrounding the microstrip line and the first radiator, wherein the ground radiator comprises a first opening and two opposite grounding ends corresponding to the first opening, the first end of the microstrip line is located in the first opening, a gap is formed between each of the two grounding ends and the first feeding end, a shape of the ground radiator is a hollow rectangle with the first opening, and a shape of the first radiator is rhombic and disposed in the hollow rectangle; and a ground plane disposed on the second surface of the substrate, wherein the ground radiator is connected to the ground plane, wherein the antenna module resonates at a frequency band, and a minimum distance between each of three ends of the first radiator away from the microstrip line and the ground radiator is greater than or equal to one-eighth of a wavelength of the frequency band.

2. The antenna module according to claim 1, wherein a width of the microstrip line is between 0.04 times and 0.06 times the wavelength of the frequency band.

3. The antenna module according to claim 1, wherein the first radiator comprises a recess portion, the second end of the microstrip line is connected to the recess portion, a width of the recess portion is greater than a width of the second end of the microstrip line, and two slots are formed between two opposite sides of the second end of the microstrip line and an edge of the recess portion.

4. The antenna module according to claim 3, wherein a length of each of the slots is between 0.05 times and 0.14 times the wavelength of the frequency band, and a width of each of the slots is 0.1 mm to 0.3 mm.

5. The antenna module according to claim 1, wherein a side length of the first radiator is a quarter of the wavelength of the frequency band.

6. The antenna module according to claim 1, wherein a shortest distance between the first radiator and each of the grounding ends is between 0.12 times to 0.14 times the wavelength of the frequency band.

7. The antenna module according to claim 1, wherein a width of the ground radiator is between 0.05 times to 0.08 times the wavelength of the frequency band.

8. The antenna module according to claim 1, wherein the ground radiator further comprises a second opening away from the first opening to divide the ground radiator into two ground radiators, and the antenna module further comprises:

a second radiator disposed on the first surface of the substrate and located in the second opening, wherein the second radiator comprises two second feeding ends; and a third radiator disposed on the first surface of the substrate and located on a side of the second radiator opposite to the first radiator.

9. The antenna module according to claim 8, wherein a length of the second radiator is a half of the wavelength of the frequency band.

10. The antenna module according to claim 8, wherein a length of the third radiator is a quarter of the wavelength of the frequency band.

11. The antenna module according to claim 8 further comprises:

two connecting radiators located in the second opening, wherein one of the connecting radiators is connected to one of the two ground radiators and the second radiator, another one of the connecting radiators is connected to another one of the two ground radiators and the second radiator, and the two ground radiators, the two connecting radiators, and the second radiator together surround the first radiator.

12. The antenna module according to claim 11, wherein widths of the second radiator, the third radiator and each of the two connecting radiators are equal and less than a width of each of the two ground radiators.

13. The antenna module according to claim 11, wherein the two connecting radiators comprise a plurality of bends, so that the second radiator and the two connecting radiators together form a notch, and the third radiator is located in the notch.

14. The antenna module according to claim 11, wherein a length of each of the two connecting radiators is between 1.5 times and 2 times the wavelength of the frequency band.

15. The antenna module according to claim 8, wherein a shape of the second radiator is annular, and a shape of the third radiator is striped.

16. The antenna module according to claim 8, wherein projections of the second radiator and the third radiator on a plane where the ground plane is located are outside the ground plane.

17. An antenna module, disposed on a substrate, wherein the substrate comprises a first surface and a second surface opposite to each other, and the antenna module comprises:

a microstrip line disposed on the first surface of the substrate and comprising a first end and a second end opposite to each other, wherein the first end comprises a first feeding end;

a first radiator disposed on the first surface of the substrate and connected to the second end of the microstrip line;

a ground radiator disposed on the first surface of the substrate and surrounding the microstrip line and the first radiator, wherein the ground radiator comprises a first opening, two opposite grounding ends corresponding to the first opening, and a second opening away from the first opening, the ground radiator is divided into two ground radiators by the first opening and the second opening, the first end of the microstrip line is located in the first opening, and a gap is formed between each of the two grounding ends and the first feeding end;

a ground plane disposed on the second surface of the substrate, wherein the two ground radiators are connected to the ground plane;

a second radiator disposed on the first surface of the substrate and located in the second opening, wherein the second radiator comprises two second feeding ends; and a third radiator disposed on the first surface of the substrate and located on a side of the second radiator opposite to the first radiator.

* * * * *